US007096885B2

(12) United States Patent
Van Decker

(10) Patent No.: US 7,096,885 B2
(45) Date of Patent: Aug. 29, 2006

(54) NON-PRESSURIZED FLOW-SPLITTING WATER SUPPLY SYSTEM

(75) Inventor: Gerald W. E. Van Decker, Ottawa (CA)

(73) Assignee: Renewability Energy Inc., Ottawa (CA)

(*) Notice: Subject to any disclaimer, the term of this patent is extended or adjusted under 35 U.S.C. 154(b) by 311 days.

(21) Appl. No.: 10/650,674

(22) Filed: Aug. 29, 2003

(65) Prior Publication Data

US 2005/0045232 A1 Mar. 3, 2005

(51) Int. Cl.
*G05D 7/00* (2006.01)

(52) U.S. Cl. ............................... 137/561 A; 137/561 R

(58) Field of Classification Search ............. 137/236.1, 137/357, 362, 561 R, 561 A
See application file for complete search history.

(56) References Cited

U.S. PATENT DOCUMENTS

| | | | | | |
|---|---|---|---|---|---|
| 2,734,224 | A | * | 2/1956 | Winstead | 137/561 A |
| 3,650,292 | A | * | 3/1972 | Platz et al. | 137/561 A |
| 3,794,056 | A | * | 2/1974 | Warren | 137/561 A |
| 4,121,914 | A | * | 10/1978 | Kigawa et al. | 137/561 A |
| 4,333,629 | A | * | 6/1982 | Roy | 137/561 A |
| 4,609,009 | A | * | 9/1986 | Tisone | 137/561 A |
| 4,709,947 | A | | 12/1987 | Kniess | |
| 5,099,874 | A | | 3/1992 | Della Cave | |
| 5,322,387 | A | * | 6/1994 | Heine et al. | 137/561 A |
| 5,992,453 | A | * | 11/1999 | Zimmer | 137/561 A |
| 6,092,549 | A | | 7/2000 | Eriksson | |
| 6,261,443 | B1 | | 7/2001 | Eriksson | |

FOREIGN PATENT DOCUMENTS

| | | |
|---|---|---|
| JP | 2001241072 | 9/2001 |

* cited by examiner

*Primary Examiner*—John Rivell
(74) *Attorney, Agent, or Firm*—Curtis B. Behmann; Borden Ladner Gervais LLP

(57) ABSTRACT

A non-pressurized liquid supply system is provided for supplying a liquid, such as water, to a plurality of liquid treatment units. Pipes in an outflow stage split liquid flow from an inflow stage, possibly via at least one intermediate stage. The inflow stage and outflow stage have substantially equivalent cross-sectional areas, and the outflow stage has at least two pipes in order to split the flow to the plurality of liquid treatment units in order to achieve more effective treatment of the liquid. The inflow stage and outflow stage co-operate to maintain substantially constant liquid flow throughout the non-pressurized liquid supply system. The system preferably includes a flow-splitting horizontal manifold. The non-pressurized liquid supply system can be, for example, a drainwater system, a waste water system, or a chemical process system.

16 Claims, 6 Drawing Sheets

NON-PRESSURIZED FLOW-SPLITTING WATER SUPPLY SYSTEM

FIELD OF THE INVENTION

The present invention relates generally to liquid supply systems, such as drainage or waste water systems in buildings and industrial chemical processes. More particularly, the present invention relates to such liquid supply systems incorporating flow splitting.

BACKGROUND OF THE INVENTION

Drainwater typically flows out of a commercial building by way of a drain pipe. Such a drain pipe typically has a diameter of 3 or more inches. It is sometimes advantageous to treat or to remove heat from the outgoing drainwater on-site, such as in-house. Many water treatment systems (such as acid neutralization, disinfection, solids removal, and heat recovery) are not able to treat the full flow of drainwater with one unit but instead work much better by treating lower flow in several units.

Drainwater systems in which flow is split for the purposes of water treatment are taught in U.S. Pat. No. 6,092,549 to Eriksson entitled "Device in a Waste Disposal System in a Building" which issued on Jul. 25, 2000, as well as in U.S. Pat. No. 6,261,443 to Eriksson entitled "System for Handling Drain Waters of Different Degrees of Contamination" which issued on Jul. 17, 2001. These two patents are primarily concerned with the separation of drainwater having differing degrees of contamination into separate containers for separate treatment, and employ pumps to regulate the flow of drainwater.

Flow-splitting occurs most commonly when a flow of liquid, such as water or waste water, is split from one or more pipes to a plurality of pipes. Flow-splitting from one 4 inch line to multiple 4 inch lines (e.g. 16 lines) is not specifically prevented in the typical published plumbing codes. However, such flow splitting does not meet the intent of the plumbing codes because it results in a slowing down of the drainwater velocity. The reason for this slowing down is that the total drainpipe cross-sectional area increases substantially as the number of drainpipes used in the system is increased due to desired flow-splitting. Such a situation is exemplified in U.S. Pat. No. 3,853,142 to Gorman entitled "Drainage System" which issued on Dec. 10, 1974, and which relates to a drainage system for multi-floor buildings. Fittings for interconnecting drainpipes which are provided in this system have an inner diameter corresponding to that of the pipes in the stack.

U.S. Pat. No. 5,099,874 to Della Cave entitled "Residential Waste Disposal System" and issued on Mar. 31, 1992 relates to a residential waste water disposal system for a building which saves and recycles the grey waste water for lawn and plant irrigation. The system includes three different types of T-fittings used with two passageway waste water pipes, each T-fitting designed to interconnect to axially aligned waste water pipes and having an offset opening to one of the waste water passageways in the fitting. The figures of the '874 patent show a waste water fitting having two parallel but separate passageways within the pipe, each for different types of drainwater. The different types of fittings disclosed communicate with each other by means of interconnecting passageways or where one passageway meets a wall so as to prevent cross contamination of drainwater in that particular path.

Although different cross-sectional areas are used in certain cases in the '874 patent, they are used in order to selectively limit the flow of certain types of drainwater based on their known contents or degree of contamination. The use of different cross-sectional areas does not improve drainwater flow, or the rate of such drainwater flow. Moreover, such a system does not rely solely on gravity to feed the water through the system, but uses applied pressure, such as pumps to regulate the water flow.

It is, therefore, desirable to provide a system for water supply that allows flow splitting with minimal change in drain water velocity. It is further desirable to provide a system for liquid supply, not limited for use with aqueous solutions, that allows flow splitting with minimal change in liquid flow velocity.

SUMMARY OF THE INVENTION

It is an object of the present invention to obviate or mitigate at least one disadvantage of previous flow-splitting liquid supply systems.

Whereas previous flow-splitting liquid supply systems use applied pressure such as pumps or other active means to regulate liquid flow through, for example, a water supply system, the present invention provides a non-pressurized liquid supply system that advantageously employs a combination of gravity and an engineered substantially constant cross-sectional area across different stages of pipes used for flow-splitting in the system in order to maintain substantially constant liquid flow velocity.

In a first aspect, the present invention provides a non-pressurized liquid supply system, such as a drainwater system, waste water system, or chemical process system, for supplying liquid to a plurality of liquid treatment units. The system includes an inflow stage having at least one inflow pipe, the inflow stage having an inflow stage cross-sectional area. The system also includes an outflow stage in communication with the inflow stage. The outflow stage includes a plurality of outflow pipes for feeding liquid to the plurality of liquid treatment units, the outflow pipes splitting liquid flow from the inflow stage and having an outflow stage cross-sectional area substantially equivalent to the inflow stage cross-sectional area.

In a further embodiment, the outflow stage and the inflow stage co-operate to maintain substantially constant liquid flow characteristics, such as liquid flow velocity, throughout the liquid supply system. In the case of cylindrical pipes being used in the inflow and outflow stages, the combined outflow stage cross-sectional area can be determined based on the number of inflow pipes in the inflow stage, and on diameters of the inflow pipes and the outflow pipes. The selection of pipes used in the inflow and outflow stages can be based on the number, size and cross-sectional area of pipes to be used. Pipes in each pipe stage can preferably have the same cross-sectional area, and therefore diameter in the case of cylindrical pipes, as each other.

In a still further embodiment, the liquid supply system further includes an intermediate stage having a intermediate stage cross-sectional area and including a plurality of intermediate pipes. The intermediate pipes are selected so that the intermediate stage cross-sectional area is substantially equivalent to either the inflow stage cross-sectional area or to the combined outflow stage cross-sectional area. The selection of intermediate pipes can be based on the number, size and cross-sectional area of pipes to be used. The liquid supply system can also include a manifold having an inflow end for receiving the at least one inflow pipe, and having an outflow end for receiving the plurality of outflow pipes.

In a further aspect, the present invention provides a manifold for use in a non-pressurized liquid supply system for supplying liquid to a plurality of liquid treatment units in which a substantially equivalent cross-sectional area is maintained across pipe stages in the non-pressurized liquid supply system. The manifold includes an inflow end including at least one inflow connector for receiving an inflow stage having at least one inflow pipe, the inflow stage having an inflow stage cross-sectional area. The manifold also includes an outflow end including a plurality of outflow pipe connectors for receiving a plurality of outflow pipes of an outflow stage. The number of outflow pipe connectors is selected so that an outflow stage cross-sectional area is substantially equivalent to the inflow stage cross-sectional area.

In a further embodiment, the outflow end can be angled so as to facilitate liquid flow out of the manifold, and the inflow end can be angled so as to facilitate liquid flow into the manifold, each taking advantage of the earth's gravity. When the inflow end has one inflow connector, and the outflow connectors can be perpendicular to the inflow connector. The manifold is preferably a horizontal manifold, although it can be a vertical manifold or be provided at any angle to the horizontal or vertical. The manifold can further include an intermediate stage having a intermediate stage cross-sectional area and including a plurality of intermediate pipes. In the intermediate stage, the intermediate pipes are selected so that the intermediate stage cross-sectional area is substantially equivalent to the combined outflow stage cross-sectional area. The selection of intermediate pipes can be based on the number, size and diameter of pipes to be used.

The manifold can include an intermediate manifold including the intermediate stage, the intermediate manifold having an intermediate inflow end for interconnecting the inflow stage and the intermediate stage, and an intermediate outflow end for interconnecting the intermediate stage and the outflow stage. The inflow end and the outflow end can be arranged in different manners such that, when in place, the outflow pipes are either generally parallel or generally perpendicular to the at least one inflow pipe.

In a yet further aspect, there is provided a method of supplying liquid to a plurality of liquid treatment units. The method includes the following steps: receiving a liquid flow via an inflow stage including at least one inflow pipe, the inflow stage having an inflow stage cross-sectional area; splitting the liquid flow from the inflow stage via an outflow stage, in communication with the inflow stage, the outflow stage including a plurality of outflow pipes, the outflow pipes splitting water flow from the inflow stage and having an outflow stage cross-sectional area substantially equivalent to the inflow stage cross-sectional area; and providing the split water flow to the plurality of liquid treatment units.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
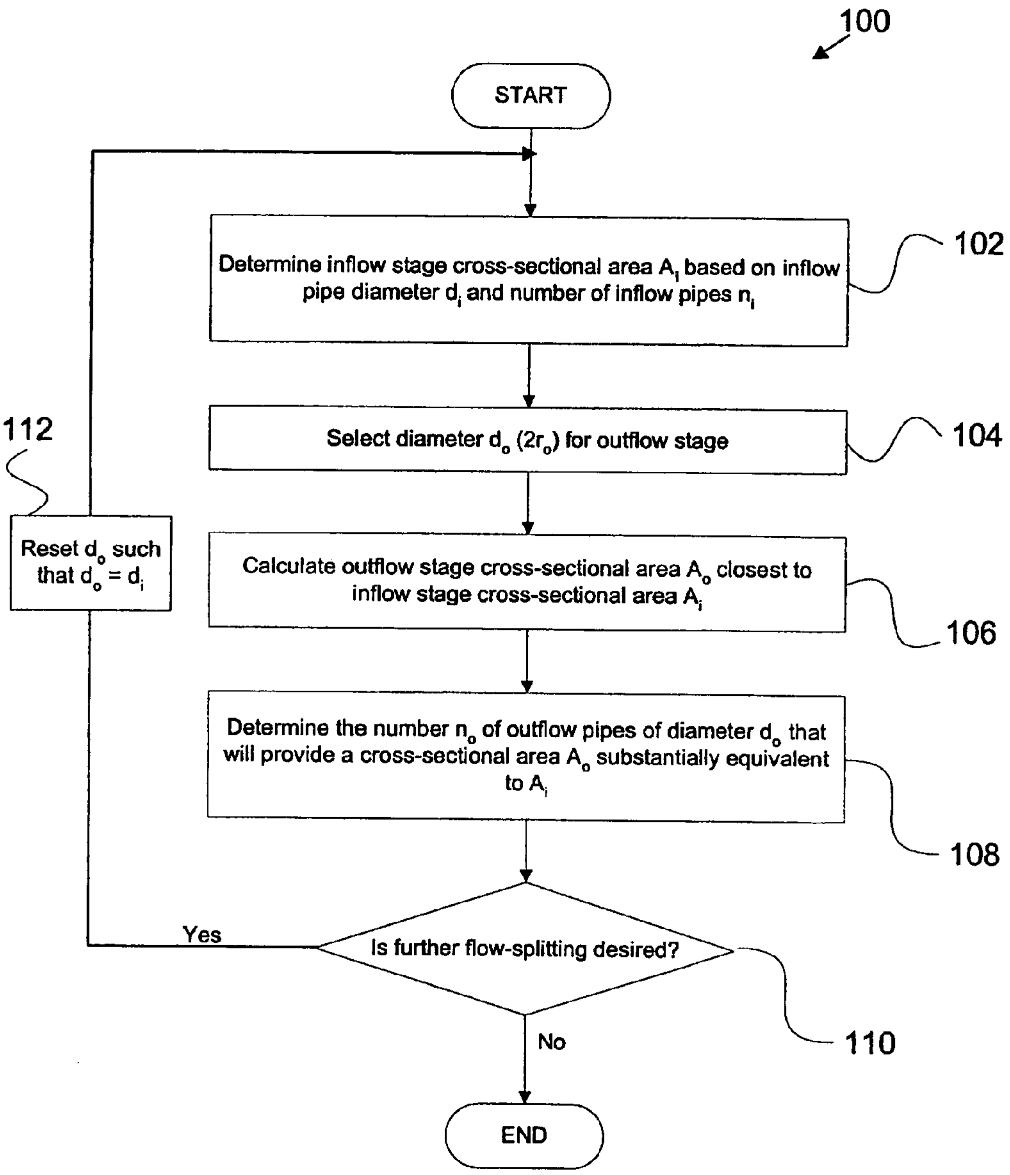
FIG. 1 is a flowchart illustrating a non-pressurized liquid supply system design method according to an embodiment of the present invention.

Generally, the present invention provides a non-pressurized liquid supply system for supplying a liquid, such as water, to a plurality of liquid treatment units. Pipes in an outflow stage split liquid flow from an inflow stage, possibly via at least one intermediate stage. The inflow stage and outflow stage have substantially equivalent cross-sectional areas, and the outflow stage has at least two pipes in order to split the flow to the plurality of liquid treatment units in order to achieve more effective treatment of the liquid. The inflow stage and outflow stage co-operate to maintain substantially constant liquid flow throughout the non-pressurized liquid supply system. The system preferably includes a flow-splitting horizontal manifold. The non-pressurized liquid supply system can be, for example, a drainwater system, waste water system, or chemical process system.

The term "non-pressurized liquid supply system" as used herein represents any free-flowing, gravity-fed liquid supply system that is not under applied pressure. More specifically, the term "liquid supply system" as used herein represents any system of interconnected pipes, such as drainpipes, through which a liquid can flow from at least one inflow point to a plurality of liquid treatment units. Examples of such a liquid supply system include a drainwater system, a waste water system, and a chemical process system. The term "liquid" as used herein represents any liquid, such as a chemical substance, or any other aqueous solution, liquid or semi-liquid substance, such as drainwater, waste water or other waste liquid, sludge, grey water, blackwater or any liquid having solid and/or semi-solid components.

The term "pipe" as used herein represents any stationary pipe, tube, channel, or any other material that can be used to transport or convey liquid. The present invention is not limited to pipes which are cylindrical in shape. The term "flow-splitting" or other references to liquid flow being split as used herein represents splitting flow from one or more inflow pipes to a plurality of outflow pipes. The end result when flow is split is that the outflow is provided in more than one outflow pipe, so that subsequent liquid treatment can be more effectively performed by treating lower flow in several liquid treatment units, as opposed to treating a higher flow with only one liquid treatment unit. Although the typical example of flow-splitting occurs when flow is split from a first stage of pipes having few pipes to a second stage of pipes having more pipes than the first stage, flow-splitting according to embodiments of the present invention also encompasses the situation wherein flow from a plurality of inflow pipes is recombined to a smaller plurality of outflow pipes.

Interconnected pipes in a liquid supply system can include a plurality of pipe stages. The term "pipe stage" as used herein represents all pipes being used to accomplish the same task, such as liquid inflow or intake, intermediate liquid transport, or liquid outflow or output to a plurality of liquid treatment units. The pipes in each stage need not have the same shape or same diameter as each other, although presently preferred embodiments include pipes having either or both of those common features. An "inflow stage" includes one or more inflow pipes for bringing liquid into the liquid supply system. An "outflow stage" includes a plurality of outflow pipes for supplying liquid to a plurality of liquid treatment units. The terms "upstream" and "downstream" as used herein represent a position relative to the direction of liquid flow. For example, if a 4 inch pipe is flow split into two 3 inch pipes, the 4 inch pipe is said to be upstream from the 3 inch pipes, and the pipe stage having pipes of 3 inches in diameter is said to be downstream from the 4 inch pipe. The term "liquid treatment unit" as used herein represents any unit capable of treating a liquid in order to modify one of its properties or energy content. Specific examples include, but are not limited to, water treatment units, such as those used to perform acid neutralization, disinfection, solids removal, or heat recovery.

In accordance with embodiments of the present invention, a particular design method is advantageously employed in order to obtain a non-pressurized liquid supply system in which the cross-sectional area from one pipe stage to another pipe stage is substantially constant, thereby maintaining a substantially constant liquid flow. In this description, cross-sectional areas of two pipe stages are considered to be "substantially similar" or "substantially constant" if it would be considered to be effectively equivalent by one skilled in the art, or if it meets the requirements set out by those skilled in the art, or those who work in the trade. A specific example of this is that the closest possible values of cross-sectional area are achieved while using standard, or commonly available, round pipes.

The cross-sectional area of a pipe can be easily determined by using commonly known equations. Since pipes are typically substantially cylindrical in shape, the cross-sectional area of a pipe is substantially circular in shape. In this description, reference to "cross-sectional area" can include an actual cross-sectional area of a pipe or a nominal cross-sectional area of a pipe. Nominal cross-sectional area is based upon the nominal diameter of a pip which is not necessarily the actual inner diameter of the pipe. As such, the cross-sectional area of the pipe can be determined simply by using the known formula for determining the area of a circle, namely: $A=\pi r^2$, where A is the area, such as the cross-sectional area of the pipe, and r is the radius of the pipe, and $\pi$ is the well-known mathematical constant approximated to nine significant digits as 3.141592653. Of course, the radius r of a pipe is related to the diameter d of the pipe by the equation $r=d/2$. Throughout the description, any discussion relating to the radius or diameter of a pipe is not limited to either of those two values and should be understood to be applicable to both.

Since one of the most commonly used pipes in drainwater applications is a drainpipe having a diameter of 4 inches, this pipe will be used as an example of an inflow pipe in an inflow stage of a liquid supply system. Of course, any other pipe diameter or shape can be used for the inflow pipe. Typically, in a liquid supply system according to an embodiment of the present invention, flow will initially be split from an inflow pipe having a diameter equal to the inflow pipe diameter. Using the above equation and relationships, a cross-sectional area, $A_4$, for a pipe having a diameter of 4 inches can be calculated to be $A_4=16\pi$.

In general, a pipe stage can include round pipes and non-round pipes, with the pipes being of different diameters. In such a case, the pipe stage cross-sectional area would be considered to be the combined cross-sectional area of each of the different pipes. In presently preferred embodiments of the present invention, all pipes used are round, or cylindrical, pipes. In further presently preferred embodiments of the present invention, each pipe stage includes round, or cylindrical, pipes each having the same diameter. As such, for those preferred conditions, the total cross-sectional area of a given pipe stage is represented by the equation $$A=n\pi r^2 \quad (1)$$

where n is the number of pipes in the pipe stage. However, it is to be noted that this is simply a presently preferred embodiment. Other embodiments also within the scope of the invention include a pipe stage wherein not all of the pipes in the pipe stage are round, or cylindrical, and may not all have the same size, but do have substantially the same cross-sectional area of the previous, or subsequent, stage. In that case, the pipe stage cross-sectional area is calculated based on the total area of all of the different pipes in the pipe stage.

In a method according to an embodiment of the present invention, a liquid supply system is designed in which the cross sectional area from one pipe stage to another is substantially constant, thereby maintaining a substantially constant liquid flow therethrough. Therefore, the generalized relationship between the cross-sectional area of an inflow stage, or upstream pipe stage, and an outflow stage, or liquid supply stage or downstream pipe stage, can be expressed as $$n_i\pi r_i^2=n_o\pi r_o^2 \quad (2)$$

which can be simplified as $$n_ir_i^2=n_or_o^2 \quad (3)$$

Ideally, the diameter of each outflow pipe, and the number of outflow pipes, is selected such that the outflow stage has an outflow stage cross-sectional area substantially similar to the inflow stage cross-sectional area. Stated more generally, the diameter of a downstream pipe, and the number of pipes in a downstream pipe stage, is selected such that the downstream pipe stage has a cross-sectional area substantially similar to the cross-sectional area of the pipes in the drainpipe stage immediately upstream from it.

FIG. 1 is a flowchart illustrating a liquid supply system design method according to an embodiment of the present invention. The method can preferably be implemented as software stored in a computer-readable memory. The method employs the concepts and relationships as discussed above. Although an inflow stage and an outflow stage are discussed herein, it is to be understood that one or more intermediate stages can be present between the inflow and outflow stages, and that determination of the diameters and numbers of pipes in those intermediate stages can be performed in accordance with the method. Also, although it is assumed in the method shown in FIG. 1 that each pipe stage includes pipes of the same diameter, it is evident that if pipes of a different diameter, or even of a different shape, are used in a pipe stage, that the pipe stage cross-sectional area can easily be calculated based on the applicable geometric equations.

In step 102, a cross-sectional area $A_i$ of an inflow stage is determined. For cylindrical pipes, this is easily determined using equation (1) based on the diameter $d_i$, or radius $r_i$, of the pipe(s) in the inflow stage, as well as on the number of pipes $n_i$ in the inflow stage. In step 104, a diameter is selected for outflow pipes in an outflow stage. The outflow pipe diameter $d_o$ is preferably selected from a universe of standard, or commonly available, pipe diameters. The outflow pipe diameter $d_o$ can be pre-selected to have a certain value, in which case step 104 is an optional step in the method.

In step 106, a cross-sectional area $A_o$ of the outflow stage is calculated, such that the value of $A_o$ is substantially similar or substantially equivalent to the value of $A_i$, keeping in mind that the determination of what is a substantial similarity of constant cross-sectional area is preferably based on the closest possible values obtainable while using standard, or commonly available, diameters for pipes in both the inflow and outflow stages. In step 108, a determination is made as to the number of outflow pipes needed to obtain a value of $A_o$. Once again, this can easily be determined using equation (1) based on the known values of $d_o$, or radius $r_o$.

For a liquid supply system having many instances of flow-splitting, this process can be repeated. The process can also be repeated if additional flow-splitting is desired using the current number of stages. In step 110, it is determined whether further flow-splitting is required. If the answer is yes, then this means that values must be calculated for a pipe stage further downstream than the outflow stage for which values have just been calculated. Therefore, the method proceeds to step 112 in which the current value of diameter $d_o$, or radius $r_o$, is set to be the new value of $d_i$, or radius $r_i$. Note that in this case, the nomenclature of "inflow" is now relative to the soon to be added new outflow stage, and not with respect to the entire liquid supply system. Also note that after many iterations of the method, it is possible to only use the inflow stage values and final outflow stage values and have those stages communicate directly with each other, without the need for intermediate stages. Note that either one of the two values $A_i$ and $A_o$ can be used for subsequent iterations of the method. When it is determined in step 110 that no further flow-splitting is desired, the method according to an embodiment of the present invention comes to an end.

As mentioned earlier, in practical terms it is preferable to make use of pipes having commonly available diameters. This is one reason why embodiments of the present invention prefer the maintaining or achieving of a substantially similar, or constant, cross-sectional area. As such, consider a situation in which it is desired to split the flow of water from an inflow pipe having a 4 inch diameter. In order to determine the number no of outflow pipes required to achieve a substantially similar, or substantially constant, cross-sectional area, it is preferable to select a particular outflow pipe diameter or radius. Since 3 inch pipes are readily available, this diameter is selected as the outflow pipe diameter to be connected downstream from a 4 inch drainpipe.

Flow-splitting schemes in accordance with embodiments of the present invention split flow from one or more inflow pipes to a plurality of outflow pipes. The end result when flow is split is that the outflow is provided in more than one outflow pipe, so that subsequent liquid treatment can be more effectively performed by treating lower flow in several liquid treatment units, as opposed to treating a higher flow with only one liquid treatment unit. Although the typical example of flow-splitting occurs when flow is split from a first stage of pipes having few pipes to a second stage of pipes having more pipes than the first stage, flow-splitting according to embodiments of the present invention also encompasses the situation wherein flow from a plurality of inflow pipes is split to a smaller plurality of outflow pipes.

Consider a flow-splitting scheme in which the inflow stage has fewer pipes than the outflow stage. In general, such a flow-splitting scheme can be considered as including a plurality of pipe stages in which flow is being split from one inflow pipe, or upstream pipe, to a plurality of outflow pipes, or downstream drainpipes. Therefore, if we substitute $n_i=1$ into equation (3), the equation can be rearranged to solve for the number downstream drainpipes and the radius of the downstream drainpipes as follows:

$$n_o=r_i^2/r_o^2 \quad (4) \text{ and}$$

$$r_o^2=r_i^2/n_o \quad (5).$$

Therefore, it is apparent from equations (4) and (5) that given the radius (or diameter) of the inflow pipe and either the number of outflow pipes or the outflow pipe radius (or diameter), it is possible to design a liquid supply system according to a method of the present invention in which a substantially constant cross-sectional area is maintained as flow is split from an inflow stage to an outflow stage. Expressed in other words, the cross-sectional area of a stage of downstream drainpipes is made to be substantially equivalent to the cross-sectional area of a stage of upstream drainpipes, whether it be the immediately upstream drainpipe stage or any drainpipe stage further upstream.

Inserting the values of $r_i=2$, and $r_o=3/2$ into equation (4) and solving for $n_o$, the calculated result is $n_o=1.77$, which is approximated as 2, since it is necessary to round to the nearest whole number. With the equations above, it is possible to consider some common drainpipe diameters and determine the number of drainpipes to be used in a flow-splitting liquid supply system design according to an embodiment of the present invention. Table 1 below provides and example of combinations of drainpipe diameters and numbers of drainpipes in a pipe stage which can be used to achieve a substantially constant cross-sectional area.

TABLE 1

| Nominal pip diameter in pipe stage (inches) | Number of pip s in pipe stage | Nominal cross-sectional area of pipe stage (inches$^2$) |
|---|---|---|
| 4 | 1 | $4\pi = 12.57$ |
| 3 | 2 | $9\pi/2 = 14.14$ |
| 2 | 4 | $4\pi = 12.57$ |
| 1½ | 8 | $9\pi/2 = 14.14$ |
| 1 | 16 | $4\pi = 12.57$ |
| ¾ | 32 | $9\pi/2 = 14.14$ |

As can be seen from the above table, the cross-sectional area of the pipe stages alternates between two proximate values, namely $4\pi$ and $4.5\pi$. In essence, it can be seen that when the pipe diameter is halved, it is necessary to have four times the number of pipes in the downstream pipe stage in order to achieve a substantially similar or constant pipe stage cross-sectional area. In a preferred embodiment of the present invention, the cross-sectional area is deemed to be substantially similar or substantially constant when the closest value is achieved while using standard pipe diameters. Also, it is not necessary to go to the immediately closest pipe diameter. For instance, flow could be split from an inflow stage having one 4 inch inflow pipe to an outflow stage having sixteen 1 inch outflow pipes, with no intermediate stages or it can be split to an outflow stage having fifteen 1 inch outflow pipes with no intermediate stages, because that would have substantially the same cross-sectional area.

Considering the above method in different terms, suppose that we impose a preferred restriction that any pipes used in a liquid supply system are to have standard, or commonly available, diameters. As such, the universe of pipe diameters from which diameters of pipes in the different pipe stages can be selected is generally known. Therefore, knowing the diameter of an inflow pipe and a desired diameter for an outflow pipe, and assuming that there is one pipe in the inflow stage, the design method according to an embodiment of the present invention basically consists of determining a number of outflow pipes in the outflow stage to achieve a substantially similar inflow stage cross-sectional area and outflow stage cross-sectional area. Of course, this step can include calculating the inflow stage cross-sectional area, then determining the number of outflow pipes that yields an outflow stage cross-sectional area substantially similar to the calculated inflow stage cross-sectional area.

In order to achieve the desired flow-splitting and to facilitate the provision of a liquid supply system according to an embodiment of the present invention, a manifold is preferably provided for interconnecting an inflow pipe, or upstream pipe, to a plurality of outflow pipes, or downstream pipes. In a preferred embodiment, a manifold is provided for interconnecting an inflow stage having at least one inflow pipe to an outflow stage having a plurality of outflow pipes.

Figure 2:
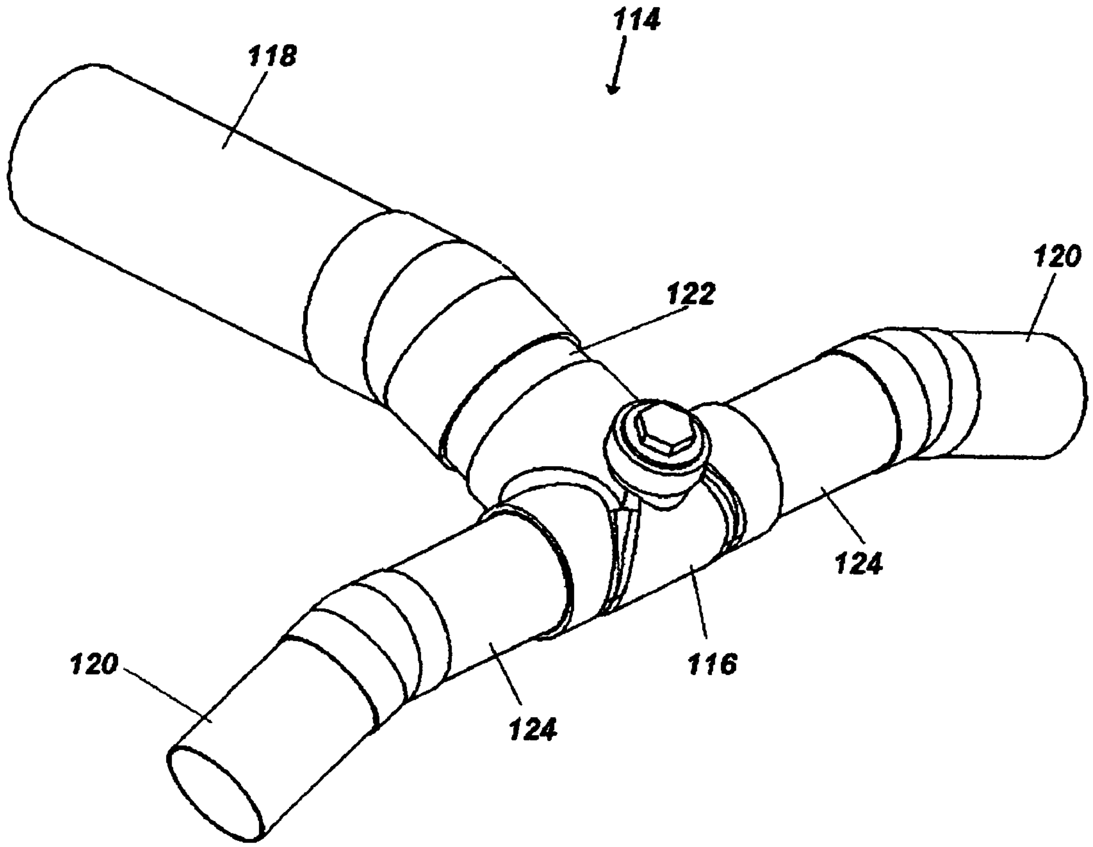
FIG. 2 is a perspective view of a manifold and non-pressurized liquid supply system according to an embodiment of the present invention.

FIG. 2 is a perspective view of a manifold and non-pressurized liquid supply system according to an embodiment of the present invention. The liquid supply system in this case is preferably a water supply system, such as a drainwater system or waste water system. This embodiment is illustrative of a case in which the number of outflow pipes is greater than the number of inflow pipes. Non-pressurized liquid supply system 114 as shown in FIG. 2 includes a manifold 116 that facilitates communication between an inflow pipe 118 and outflow pipes 120. In the embodiment shown in FIG. 2, an inflow stage preferably has one inflow pipe 118 having a diameter of 4 inches, whereas an outflow stage preferably has two outflow pipes 120 each having a diameter of 3 inches. This results in a substantially similar cross-sectional area, as shown in Table 1 above.

As such, FIG. 2 illustrates an inflow stage including at least one inflow pipe 118, the inflow stage having an inflow stage cross-sectional area. Furthermore, FIG. 2 illustrates an outflow stage, in communication with the inflow stage, including a plurality of outflow pipes 120 for feeding liquid to a plurality of liquid treatment units, the outflow pipes splitting water flow from the inflow stage and having an outflow stage cross-sectional area substantially equivalent to the inflow stage cross-sectional area. It is also evident in this embodiment that the number of outflow pipes is greater than the number of inflow pipes, this arrangement being necessary for this particular type of flow-splitting.

The manifold 116 has an inflow end and a outflow end. The inflow end preferably has an inflow pipe connector 122 for receiving an inflow stage having at least one inflow pipe having an inflow pipe diameter, the inflow stage having an inflow stage cross-sectional area. The outflow end preferably includes a plurality of outflow pipe connectors 124. Each of the outflow pipe connectors 124 is for receiving a plurality of outflow pipes of an outflow stage, each outflow pipe having an outflow pipe diameter. The number of outflow pipe connectors 124 is chosen to match the number of outflow pipes, which is selected so that a combined outflow stage cross-sectional area is substantially equivalent to the inflow stage cross-sectional area. The manifold may be horizontal, vertical or at any other angle to enable the non-pressurized flow of liquid.

Typically, each of the inflow and outflow pipe connectors 122 and 124 of the manifold 116 are angled slightly at a downstream end of each of the connectors towards the direction of the earth's gravity, and thus in the direction of water flow, as illustrated in FIG. 2, though this is only a presently preferred embodiment. Different outflow and inflow pipe connectors can meet the body of the manifold at different angles at the outflow and inflow end, respectively. The inflow pipe connectors and the outflow pipe connectors can be at any angle to each other. In the case where there is one inflow pipe connector, the outflow pipe connectors are preferably perpendicular to the inflow pipe connector, as illustrated in FIG. 2.

Although the embodiment shown in FIG. 2 illustrates flow-splitting from one inflow pipe to two outflow pipes, this is only an example. Alternatively, the water supply system could achieve flow-splitting from one inflow pipe to a larger number of outflow pipes, such as 16 outflow pipes. Though it is often preferred in practice, it is not necessary to split flow in stages from one pipe to two pipes. Such flow splitting can be achieved by splitting from one inflow pipe to a multiplicity of outflow pipes.

An inflow stage and/or an outflow stage according to embodiments of the present invention can have any number of pipes, and can include pipes having different diameters and/or different shapes, as long as the outflow stage cross-sectional area is substantially equivalent to the inflow stage cross-sectional area.

According to another embodiment of the present invention, the liquid supply system as described above can be used as a preferred means to implement a method of supplying liquid to a plurality of liquid treatment units. The method includes the following steps: receiving a liquid flow via an inflow stage including at least one inflow pipe, the inflow stage having an inflow stage cross-sectional area; splitting the liquid flow from the inflow stage via an outflow stage, in communication with the inflow stage, the outflow stage including a plurality of outflow pipes, the outflow pipes splitting water flow from the inflow stage and having an outflow stage cross-sectional area substantially equivalent to the inflow stage cross-sectional area; and providing the split water flow to the plurality of liquid treatment units.

Figure 3:
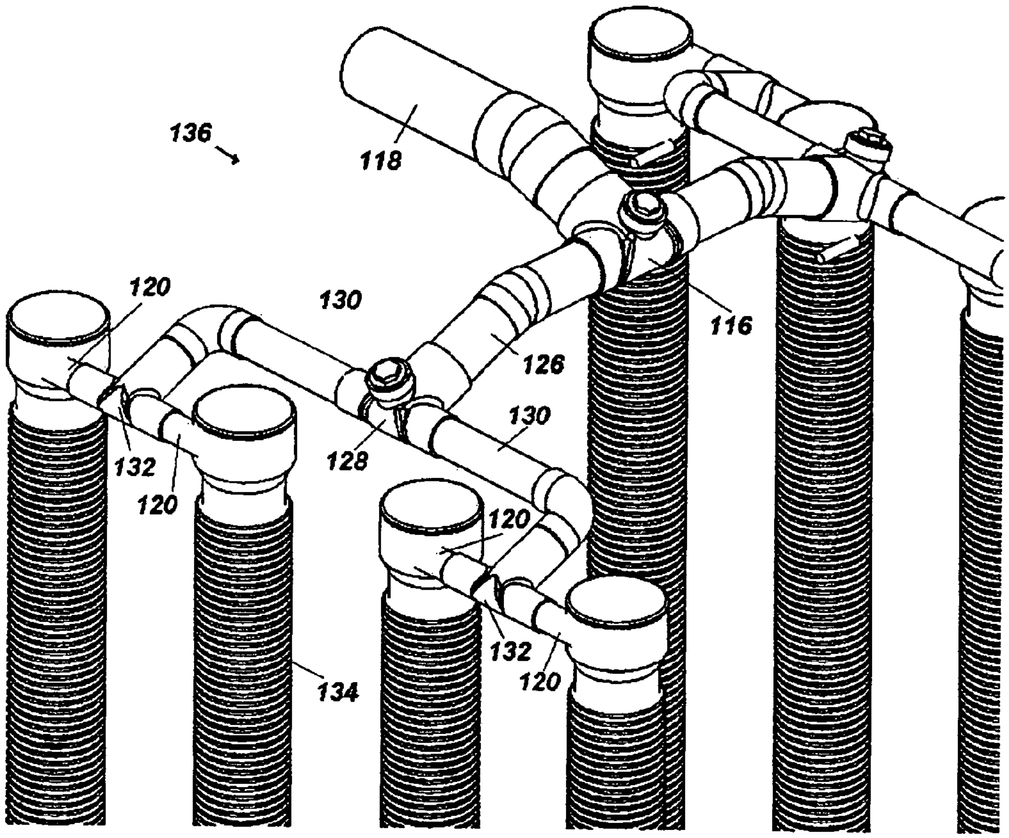
FIG. 3 is a perspective view of a manifold and non-pressurized liquid supply system according to another embodiment of the present invention.

FIG. 3 is a perspective view of a manifold and non-pressurized liquid supply system according to another embodiment of the present invention. Whereas FIG. 2 illustrates a non-pressurized liquid supply system having an inflow stage and a outflow stage, FIG. 3 illustrates a non-pressurized liquid supply system having an inflow stage, a plurality of intermediate stages, and a outflow stage.

In FIG. 3, the manifold 116 is connected to the inflow pipe 118 as in FIG. 2. However, the outflow stag of FIG. 2 is now a first intermediate stage in FIG. 3. Therefore, each of first intermediate pipes 126 of a first intermediate stage serves as an inflow pipe flowing into manifold 128, which interconnects the first intermediate pipes 126 with second intermediate pipes 130 of a second intermediate stage. Similarly, each of the second intermediate pipes 130 subsequently serves as an inflow pipe flowing into manifolds 132, which interconnect the second intermediate pipes 130 with outflow pipes 120 of a outflow stage. Any of the pipes in the water supply system can include angled portions, such as illustrated in FIG. 3 in the case of the second intermediate pipes 130. This is implemented in situations where space is better used if the pipes can be pointed in a particular direction.

In FIG. 3, each outflow pipe 120 is shown to advantageously flow into a liquid treatment unit 134. Such a liquid treatment unit can be, for example, a gravity film exchanger as described in U.S. Pat. No. 4,619,311 issued to Vasile et al. on Oct. 28, 1986. Of course, each of the pipe stages has its own pipe diameter(s) and pipe stage cross-sectional area.

It is to be understood that although a plurality of intermediate stages are shown in FIG. 3, the non-pressurized liquid supply system can alternatively include only one intermediate stage. In fact, the two intermediate stages, described later collectively as a manifold 136, can alternatively be considered to be a single combined intermediate stage facilitating communication between the inflow stage and the outflow stage. The intermediate stage has an intermediate stage cross-sectional area and includes a plurality of intermediate pipes each having an intermediate pipe diameter, the number of intermediate pipes being greater than the number of inflow pipes and less than the number of outflow pipes, and the number of intermediate pipes being selected so that the intermediate stage cross-sectional area is substantially equivalent to the combined outflow stage cross-sectional area, or to the inflow stage cross-sectional area.

The water supply system of FIG. 3 can be considered in two different manners. Firstly, it can be considered as a non-pressurized liquid supply system in which pipe stages are interconnected by a plurality of manifolds 116, 128 and 132, as described above. Secondly, it can be considered as a non-pressurized liquid supply system having an inflow pipe 118 and a plurality of outflow pipes 120 and in which all of the elements 116, 126, 128, 130, and 132 are integral components of the manifold 136 for interconnecting the inflow pipe 118 and the plurality of outflow pipes 120. In that case, the manifold 136 can be considered to include at least one intermediate manifold 116, 128 or 132 including the elements of an intermediate stage as outlined above, the intermediate manifold having an intermediate inflow end for interconnecting the inflow stage and the intermediate stage and an intermediate outflow end for interconnecting the intermediate stage and the outflow stage. Of course, in the case that more than one intermediate stage is present, each of the intermediate inflow ends and the intermediate outflow ends can be indirectly connected to the inflow stage and the outflow stage, respectively, as opposed to being directly in communication with those stages when only one intermediate stage is present.

In an alternative embodiment, the same end-result of flow splitting as is achieved in FIG. 3 could be achieved by a non-pressurized liquid supply system comprising an inflow stage having one inflow pipe of 4 inch diameter in direct communication with a outflow stage having eight outflow pipes of 1½ inch diameter.

Figure 4:
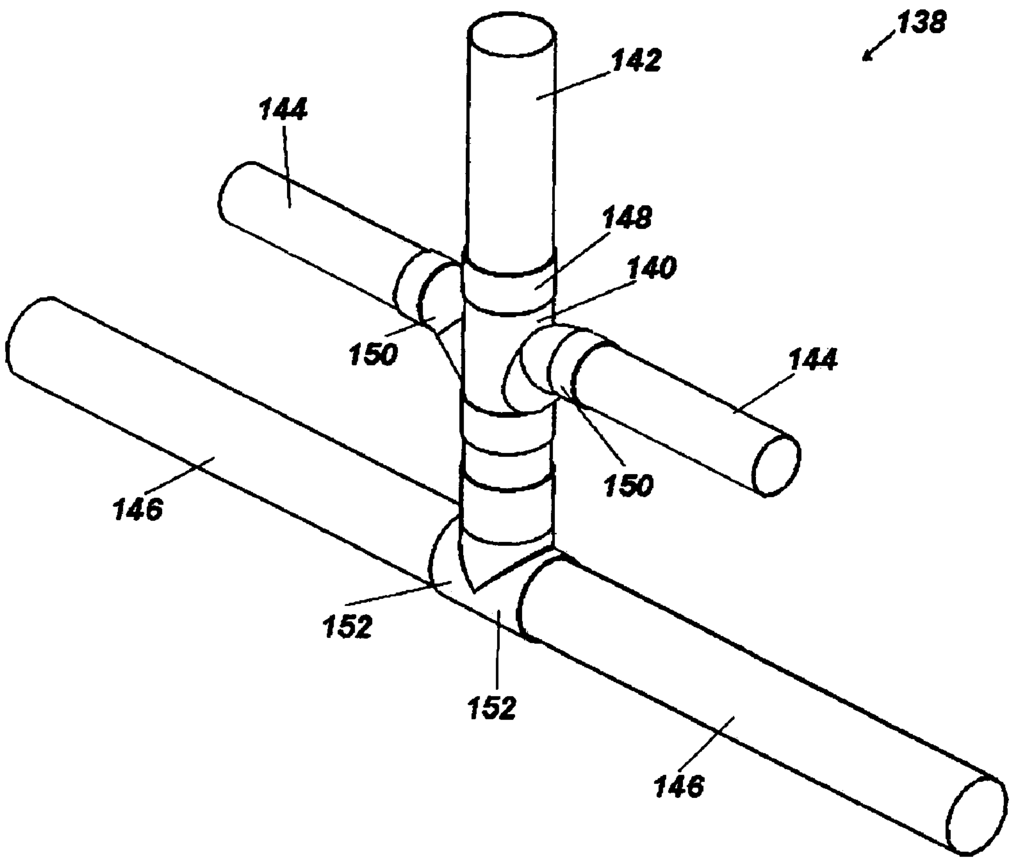
FIG. 4 is a perspective view of a manifold and non-pressurized liquid supply system according to a further embodiment of the present invention.

FIG. 4 is a perspective view of a manifold and non-pressurized liquid supply system according to another embodiment of the present invention. The liquid supply system in this case is preferably a water supply system, such as a drainwater system or waste water system. This embodiment is illustrative of a case in which the number of inflow pipes is greater than the number of outflow pipes. This embodiment is also illustrative of a case in which pipes used in a pipe stage are not all of the same diameter. Non-pressurized liquid supply system 138 as shown in FIG. 4 includes a manifold 140 that facilitates communication between a plurality of inflow pipes 142 and 144 and outflow pipes 146. In the embodiment shown in FIG. 4, an inflow stage preferably has one inflow pipe 142 having a diameter of 4 inches and two inflow pipes 144 having a diameter of 3 inches. An outflow stage preferably has two outflow pipes 146 each having a diameter of 4 inches. This results in a substantially similar cross-sectional area, as determined in accordance with Table 1 above. It is interesting to note that the two inflow pipes 142 have a substantially similar cross-sectional area to one 4 inch inflow pipe.

As such, FIG. 4 illustrates an inflow stage including at least one inflow pipe 142 and 144, the inflow stage having an inflow stage cross-sectional area. Furthermore, FIG. 4 illustrates an outflow stage, in communication with the inflow stage, including a plurality of outflow pipes 146 for feeding liquid to a plurality of liquid treatment units, the outflow pipes splitting water flow from the inflow stage and having an outflow stage cross-sectional area substantially equivalent to the inflow stage cross-sectional area. It is also evident in this embodiment that the number of inflow pipes is greater than the number of outflow pipes, this arrangement being necessary for this particular type of flow-splitting.

As mentioned previously, an inflow stage and/or an outflow stage according to embodiments of the present invention can have any number of pipes, and can include pipes having different diameters and/or different shapes, as long as the outflow stage cross-sectional area is substantially equivalent to the inflow stage cross-sectional area.

The manifold 140 has an inflow end and a outflow end. The inflow end includes at least one inflow connector for receiving an inflow stage having at least one inflow pipe. The manifold 140 is shown in FIG. 4 to receive an inflow stage having one inflow pipe 142 and two inflow pipes 144, the pipes 142 and 144 being of different diameters. As such, the inflow end preferably has one inflow pipe connector 148 for receiving the inflow pipe 142, and two inflow pipe connectors 150 for receiving the two inflow pipes 144. The inflow stage cross-sectional area can be calculated according to the equations pres nted above, taking into account the different inflow pipe diameters.

The outflow end of the manifold 140 includes a plurality of outflow pipe connectors 152. Each of the outflow pipe connectors 152 is for receiving a plurality of outflow pipes 146 of an outflow stage. In FIG. 4, the two outflow pipe connectors 152 are shown to be constructed as an integral unit or fitting. They can alternatively be implemented separately, as in the case of the inflow connectors. In FIG. 4, each of the outflow pipes 146 has the same outflow pipe diameter. However, the pipes in the outflow stage can have different diameters from each other, as long as the outflow stage cross-sectional area is substantially equivalent to the inflow stage cross-sectional area. The number of outflow pipe connectors 152 is chosen to match the number of outflow pipes, which is selected so that an outflow stage cross-sectional area is substantially equivalent to the inflow stage cross-sectional area.

The manifold can be horizontal, vertical or at any other angle to enable the non-pressurized flow of liquid. Preferably, each of the inflow and outflow pipe connectors 148, 150 and 152 of the manifold 140 are angled slightly at a downstream end of each of the connectors towards the direction of the earth's gravity, and thus in the direction of water flow. Different outflow and inflow pipe connectors can meet the body of the manifold at different angles at the outflow and inflow end, respectively, as is illustrated in FIG.

4 with respect to the inflow connectors. The inflow pipe connectors and the outflow pipe connectors can be at any angle to each other.

Without repeating the detailed discussion from above, it is evident that a non-pressurized liquid treatment system having a manifold as shown in FIG. 4 can also include one or more intermediate stages, as long as the intermediate stage cross-sectional area is substantially equivalent to the inflow stage cross-sectional area, or to the outflow stage cross-sectional area. An intermediate stage according to embodiments of the present invention can have any number of pipes, more or less than those in the inflow or outflow stages, and can include pipes having different diameters and/or different shapes, as long as the intermediate stage cross-sectional area is substantially equivalent to the inflow stage cross-sectional area, or to the outflow stage cross-sectional area. Moreover, an intermediate stage.

Figure 5:
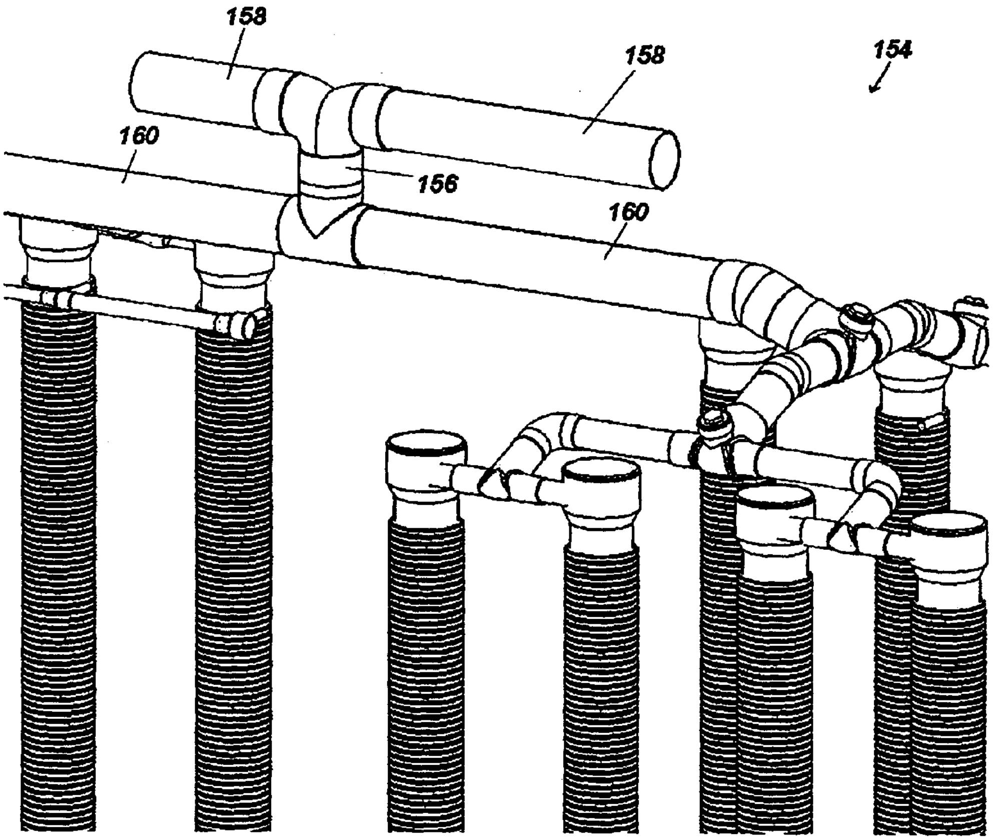
FIG. 5 is a perspective view of a manifold and non-pressurized liquid supply system according to another embodiment of the present invention.

FIG. 5 is a perspective view of a manifold and non-pressurized liquid supply system according to another embodiment of the present invention. In FIG. 5, a plurality of manifolds are shown in use in a non-pressurized liquid supply system. Each of the outflow pipes is shown to feed an individual liquid treatment unit. In non-pressurized liquid supply system 154 of FIG. 5, a manifold 156 is shown to interconnect an inflow stage having two inflow pipes 158 with an outflow stage having two outflow pipes 160. Such a system is a further example of an embodiment of the present invention. In the case where the inflow pipes 156 and the outflow pipes 158 each have a diameter of 4 inches, the flow from the inflow stage having at least one inflow pipe is still being split so that it is provided to a plurality of water treatment units via an outflow stage having a plurality of outflow pipes. Since the inflow stage and the outflow stage have the same number of pipes and all of the pipes are of the same diameter, the inflow stage and the outflow stage definitely have a substantially equivalent cross-sectional area, since the cross-sectional areas are identical.

FIG. 5 shows the use of manifolds according to an embodiment of the present invention in which the inflow end and the outflow end are arranged such that, when in place or in use, each of the downstream pipes is generally perpendicular to the pipe immediately upstream from it, as well as all other upstream pipes. Alternatively, the inflow end and the outflow end can be arranged such that, when in place, the downstream pipes are generally parallel to the pipe immediately upstream from it, as well as all other upstream pipes. In fact, the pipes can have any positional relationship to each other, since the inflow pipe connectors and the outflow pipe connectors of the manifold can be at any angle to each other and can meet the body of the manifold at different angles at the outflow and inflow end, respectively.

Figure 6:
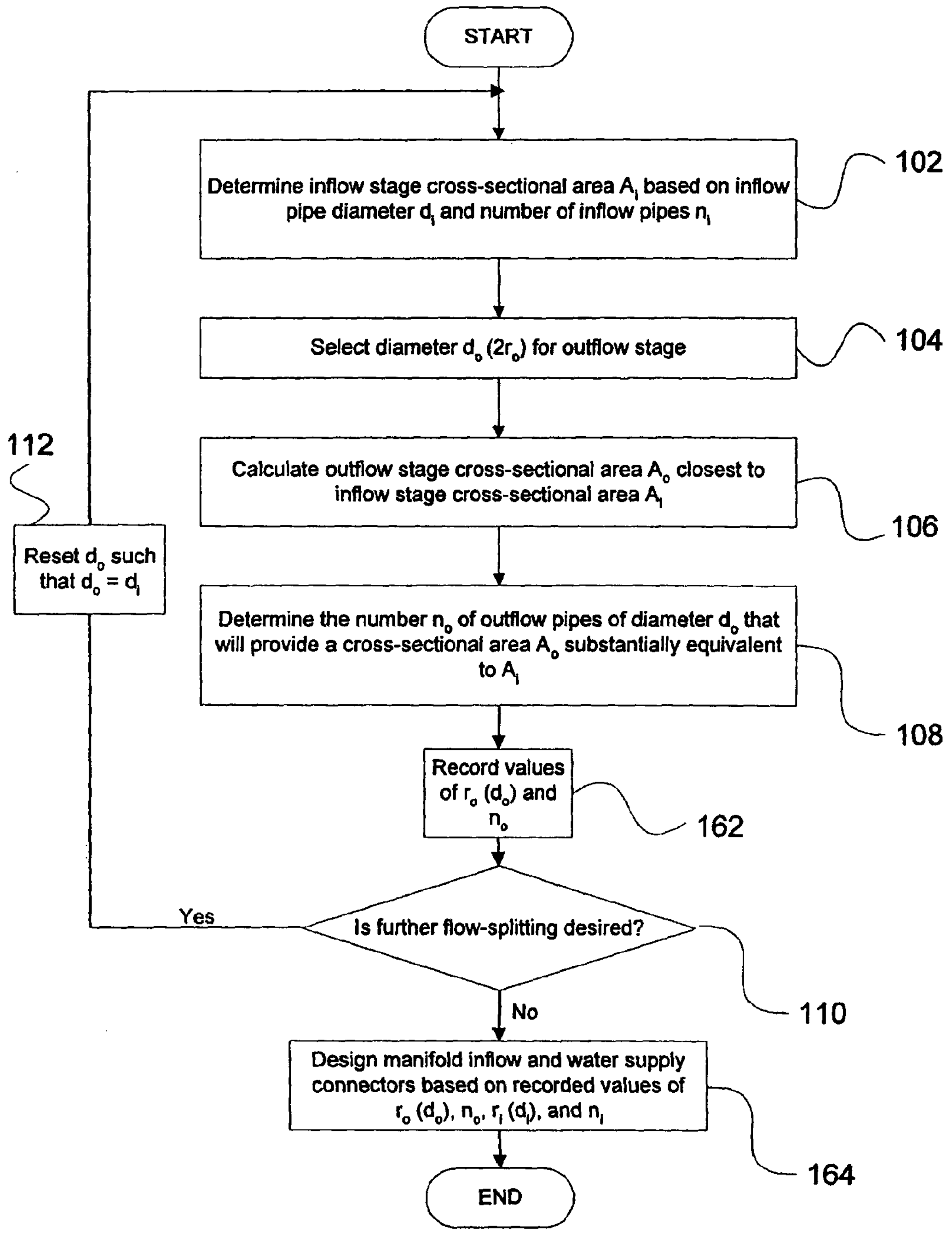
FIG. 6 is a flowchart illustrating a manifold design method according to an embodiment of the present invention.

FIG. 6 is a flowchart illustrating a manifold d sign method according to an embodiment of the present invention. The flowchart in FIG. 6 is similar to the flowchart in FIG. 1 with respect to each of steps 102, 104,106, 108 and 110. Additional step 162 is found in the method of FIG. 6 in which the determined values of $r_o$ and $n_o$ are recorded, for example, in a computer-readable memory. Also, when it has been determined in step 110 that further flow-splitting is not desired, the method of FIG. 6 proceeds to step 164 in which the upstream and downstream connectors of the manifold are designed based on the recorded values of $r_o$ and $n_o$ as well as the previously known values of $r_i$ and $n_i$.

As mentioned previously, the flow-splitting facilitated by the manifold may take place at any angle from the horizontal plane to the vertical plane; for example, the pipes can feed each other at a slightly downward angle when the water supply system is in place. Therefore, the manifold is presently preferably a horizontal manifold having portions angled slightly towards the direction of the earth's gravity. Specifically, each of the inflow and outflow pipe connectors of the manifold are preferably angled slightly at a downstream end of each of the connectors towards the direction of the earth's gravity, and thus in the direction of water flow. The design method can preferably include a design step to incorporate such a preferred feature.

Although particular embodiments have been described in relation to non-pressurized liquid supply systems involving drainwater and/or waste water, these are only examples. Other non-pressurized liquid supply systems in which embodiments according to the present invention can be used include those supplying any variety or number of liquid chemical mixtures, including oil and gas, such as a chemical process system. Furthermore, although non-pressurized liquid supply systems having constant flow have been described herein, certain advantages of embodiments of the present invention can still be achieved without having the feature of substantially equivalent cross-sectional area from one pipe stage to another.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A non-pressurized liquid supply system for supplying liquid to a plurality of liquid treatment units, the system comprising:

an inflow stage including at least one inflow pipe having a downstream end angled toward a direction of earth's gravity, the inflow stage having an inflow stage cross-sectional area; and an outflow stage in communication with the inflow stage, the outflow stage including a plurality of outflow pipes for feeding liquid to the plurality of liquid treatment units, each of the outflow pipes having a downstream end angled toward a direction of earth's gravity, the outflow pipes splitting liquid flow from the inflow stage and having an outflow stage cross-sectional area substantially equivalent to the inflow stage cross-sectional area, the outflow stage and the inflow stage co-operating to maintain substantially constant liquid flow velocity throughout the non-pressurized liquid supply system.

2. The non-pressurized liquid supply system of claim 1 wherein the inflow pipes and the outflow pipes are substantially cylindrical.

3. The non-pressurized liquid supply system of claim 2 wherein the outflow pipes all have the same diameter.

4. The non-pressurized liquid supply system of claim 2 wherein the inflow pipes all have the same diameter.

5. The non-pressurized liquid supply system of claim 1 wherein the number of outflow pipes is greater than the number of inflow pipes.

6. The non-pressurized liquid supply system of claim 1 wherein the number of inflow pipes is greater than the number of outflow pipes.

7. The non-pressurized liquid supply system of claim 1 further comprising an intermediate stage having an intermediate stage cross-sectional area and including a plurality of intermediate pipes, the intermediate pipes being selected so that the intermediate stage cross-sectional area is substantially equivalent to the inflow stage cross-sectional area.

8. The non-pressurized liquid supply system of claim 1 further comprising an intermediate stage having an intermediate stage cross-sectional area and including a plurality of intermediate pipes, the intermediate pipes being selected so that the intermediate stage cross-sectional area is substantially equivalent to the combined outflow stage cross-sectional area.

9. The non-pressurized liquid supply system of claim 1 further comprising a manifold having an inflow end for receiving the at least one inflow pipe, and having an outflow end for receiving the plurality of outflow pipes.

10. The non-pressurized liquid supply system of claim 1 wherein the non-pressurized liquid supply system is selected from the group consisting of: a drainwater system; a waste water system; and a chemical process system.

11. A manifold for use in a non-pressurized liquid supply system for supplying liquid to a plurality of liquid treatment units in which a substantially equivalent cross-sectional area is maintained across pipe stages in the non-pressurized liquid supply system, the manifold comprising:

an inflow end including at least one inflow connector for receiving an inflow stage having at least one inflow pipe having a downstream end angled toward a direction of earth's gravity, the inflow stage having an inflow stage cross-sectional area; and an outflow end including a plurality of outflow pipe connectors for receiving a plurality of outflow pipes of an outflow stage, each of the outflow pipes having a downstream end angled toward a direction of earth's gravity, the number of outflow pipe connectors being selected so that an outflow stage cross-sectional area is substantially equivalent to the inflow stage cross-sectional area the outflow end and the inflow end co-operating to maintain substantially constant liquid flow velocity throughout the non-pressurized liquid supply system.

12. The manifold of claim 11 wherein the inflow end comprises one inflow connector, and the outflow connectors are perpendicular to the inflow connector.

13. The manifold of claim 11 wherein the manifold is selected from the group consisting of: a horizontal manifold; and a vertical manifold.

14. The manifold of claim 11 further comprising an intermediate stage having an intermediate stage cross-sectional area and including a plurality of intermediate pipes, the intermediate pipes being selected so that the intermediate stage cross-sectional area is substantially equivalent to the outflow stage cross-sectional area.

15. The manifold of claim 14 further comprising an intermediate manifold including the intermediate stage, the intermediate manifold having an intermediate inflow end for interconnecting the inflow stage and the intermediate stage and an intermediate outflow end for interconnecting the intermediate stage and the outflow stage.

16. The manifold of claim 11 further comprising an intermediate stage having an intermediate stage cross-sectional area, the intermediate pipes being selected so that the intermediate stage cross-sectional area is substantially equivalent to the in flow stage cross-sectional area.

* * * * *